Aug. 21, 1923.

A. WOZNY

SAFETY ENVELOPE

Filed June 23, 1922

1,465,888

Inventor
Adam Wozny,

By *[signature]*

Attorney

Patented Aug. 21, 1923.

1,465,888

UNITED STATES PATENT OFFICE.

ADAM WOZNY, OF DETROIT, MICHIGAN.

SAFETY ENVELOPE.

Application filed June 23, 1922. Serial No. 570,317.

*To all whom it may concern:*

Be it known that ADAM WOZNY, a citizen of the United States of America, residing at Detroit, in the county of Wayne and State of Michigan, has invented new and useful Improvements in Safety Envelopes, of which the following is a specification.

The object of the invention is to provide a safety fastening device for envelopes designed as a means of preventing access to the contents surreptitiously or by anyone unfamiliar with the construction of the fastening means without mutilation of the envelope; and with this object in view the invention consists in a construction and combination of parts of which a preferred embodiment is shown in the accompanying drawings, wherein:—

Figure 1:
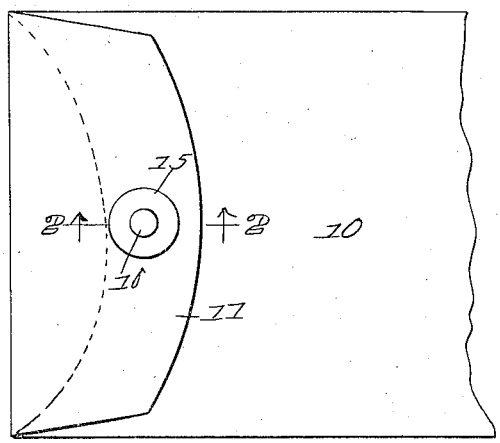
Figure 1 is a view of an envelope equipped with a fastening device embodying the invention.
Figure 2:
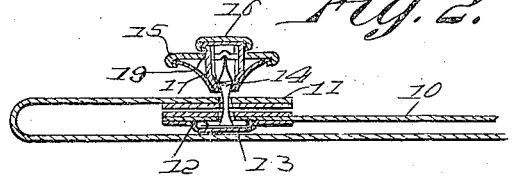
Figure 2 is a sectional view taken on the plane indicated by the line 2—2 of Figure 1.

The device is designed to provide for the secure fastening or locking of a receptacle such as the envelope 10 in a closed condition, said receptacle for example having a flap 11 arranged in overlapping relation with a wall of the receptacle so as to permit of the mutual puncturing of said wall and flap by means of a pin or shank 12 having a terminal disk 13 forming a base and adapted to be arranged within the envelope or receptacle to bear against the inner surface of the wall thereof as indicated in Figure 2.

Figure 3:
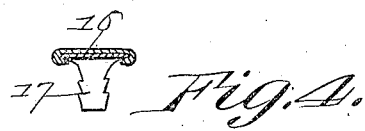
Figure 3 is a plan view of the head.
Figure 4:
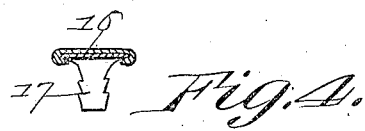
Figure 4 is a sectional view of the locking element.

The stem or shank is provided with a spear head 14 at its free end reduced to a point to facilitate forcing the same through the material, such as heavy paper, of the envelope or receptacle and fitted upon the stem is a removable head 15 carrying a locking element 16, the locking element being provided with tongues 17 which extend through guide openings 18 in the disk portion of the head 15 as shown in Figure 3 and being adapted for terminal inward deflection or contraction by the tapered or funnel shaped guide member 19 carried by the head. The outer locking element is enlarged to form a button adapted to be engaged by the finger nails to move it axially with relation to the head so as to effect the collapsing or spreading of the terminals of the tongues 17 to engage or release the spear head of the stem or shank. When the head of the fastener is fitted on the shank and the locking element is pressed inward to cause engagement of the extremities of the tongues with the shank or stem, the disengagement of the head from the shank is prevented and any attempt to open the envelope will involve the mutilation thereof and hence will facilitate detection, unless the locking element is first contracted with relation to the head sufficiently to disengage the extremities of its tongues by release from the contracting effect of the guide member 19.

Having described the invention, what is claimed as new and useful is:—

1. A locking device for the purpose indicated having a stem or shank carrying a base, and a head removably fitted upon the shank or stem and carrying a locking element for interlocking engagement with the shank or stem, said stem or shank having a terminal enlargement, the locking member having tongues for arrangement at opposite sides of said enlargement and the button having an inwardly contracted guide member for effecting an inward deflection of the extremities of said tongues.

2. A locking device for the purpose indicated having a stem or shank carrying a base, and a head removably fitted upon the shank or stem and carrying a locking element for interlocking engagement with the shank or stem, said stem or shank having a terminal enlargement, the locking member having tongues for arrangement at opposite sides of said enlargement and the button having an inwardly contracted guide member for effecting an inward deflection of the extremities of said tongues, the locking member being axially movable with relation to the head.

3. A locking device for the purpose indicated having a stem or shank carrying a base, and a head removably fitted upon the shank or stem and carrying a locking element for interlocking engagement with the shank or stem, said stem or shank having a terminal enlargement, the locking member having tongues for arrangement at opposite sides of said enlargement and the button having an inwardly contracted guide member for effecting an inward deflection of the extremities of said tongues, the locking member being axially movable with relation to the head and being provided at its outer end with an enlargement forming an operating button.

In testimony whereof he affixes his signature.

ADAM WOZNY.